United States Patent

[11] 3,597,968

| | | | |
|---|---|---|---|
| [72] | Inventor | James W. Bon<br>Margate, Fla. | |
| [21] | Appl. No. | 878,736 | |
| [22] | Filed | Nov. 21, 1969 | |
| [45] | Patented | Aug. 10, 1971 | |
| [73] | Assignee | The United States of America as represented by the Secretary of the Navy | |

[54] ROCKET ASSISTED PROJECTILE-SPIN STATIC FIRING STAND
2 Claims, 2 Drawing Figs.

[52] U.S. Cl. ........................................................ 73/117.4, 73/167

[51] Int. Cl. .................................................. G01l 5/12
[50] Field of Search ........................................... 73/117.4, 167, 140

[56] References Cited
UNITED STATES PATENTS
3,430,487  3/1969  Thorsted et al. ............... 73/117.4

*Primary Examiner*—Richard C. Queisser
*Assistant Examiner*—Marvin Smollar
*Attorneys*—R. S. Sciascia and Q. E. Hodges ABSTRACT: A thrust test stand for spin testing a solid propellant motor in which the spin drive motor is isolated from the thrust of the propellant motor.

ROCKET ASSISTED PROJECTILE-SPIN STATIC FIRING STAND

The invention described herein may be manufactured and used by or for the Government of the United States of America for governmental purposes without the payment of any royalties thereon.

BACKGROUND OF THE INVENTION

In the prior art it has been conventional to test rocket propellant motors either in a static test or in a spin test fixture in which generally the thrust of the propellant motor was transmitted through the shaft of the spin drive motor to a thrust sensing device.

It is necessary to test the rocket motors under spin conditions as this more closely resembles the actual operating conditions of the test motor. Thus, data received correlates more closely to actual operating conditions. The transmitting of the rocket motor force through the shaft of the spin drive motor to a thrust sensing device causes rapid deterioration of the motor. For a further explanation of the utility of this type of test stand one might refer to the patent to Thorsted, U.S. Pat. No. 3,430,487.

The principal object of this invention is to provide a test stand for solid propellant motors which transmits the thrust of the propellant motor to the sensor without subjecting the spin motor to the thrust of the propellant motor.

Another object of this invention is to improve the durability of the mechanism of the test stand.

Other objects and advantages will become apparent from the following description and appended claims, as well as the accompanying drawings.

DESCRIPTION OF THE PREFERRED EMBODIMENT

Figure 1:
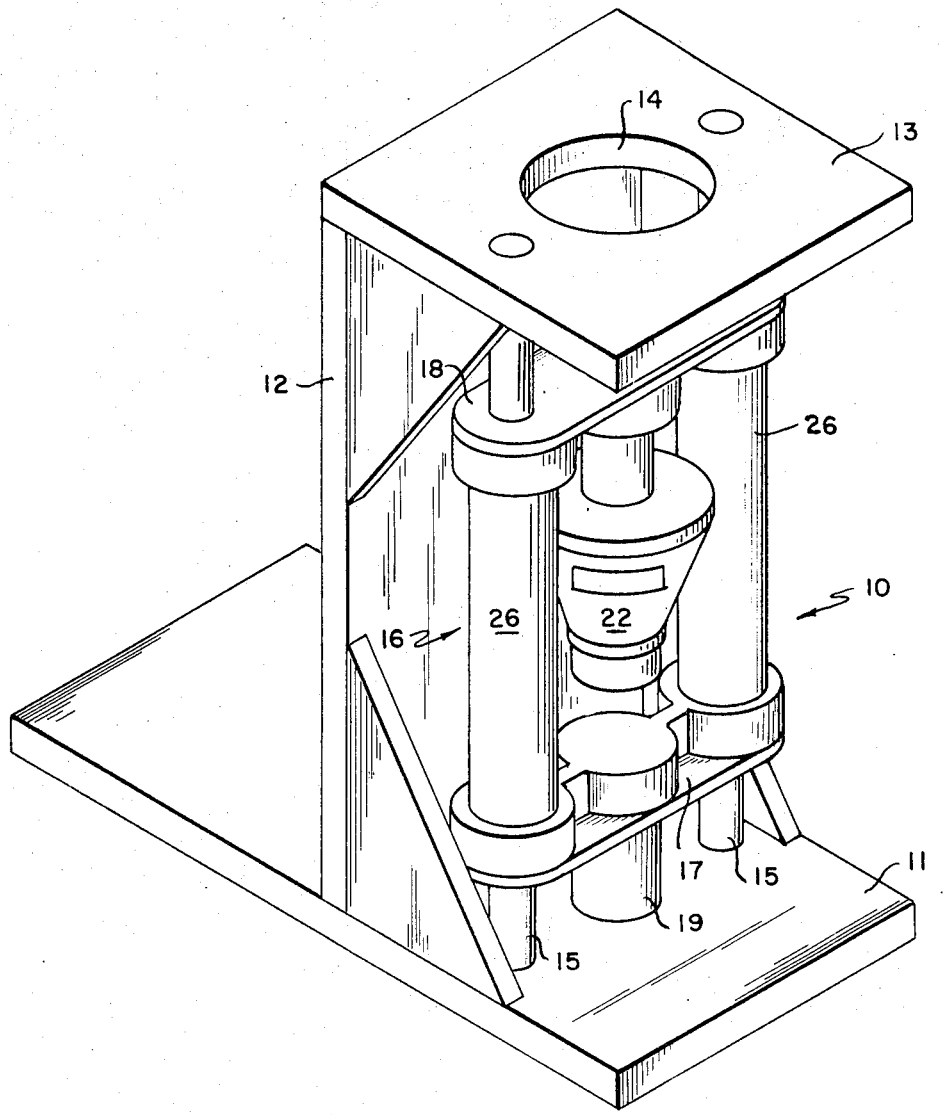
FIG. 1 is a perspective view.
Figure 2:
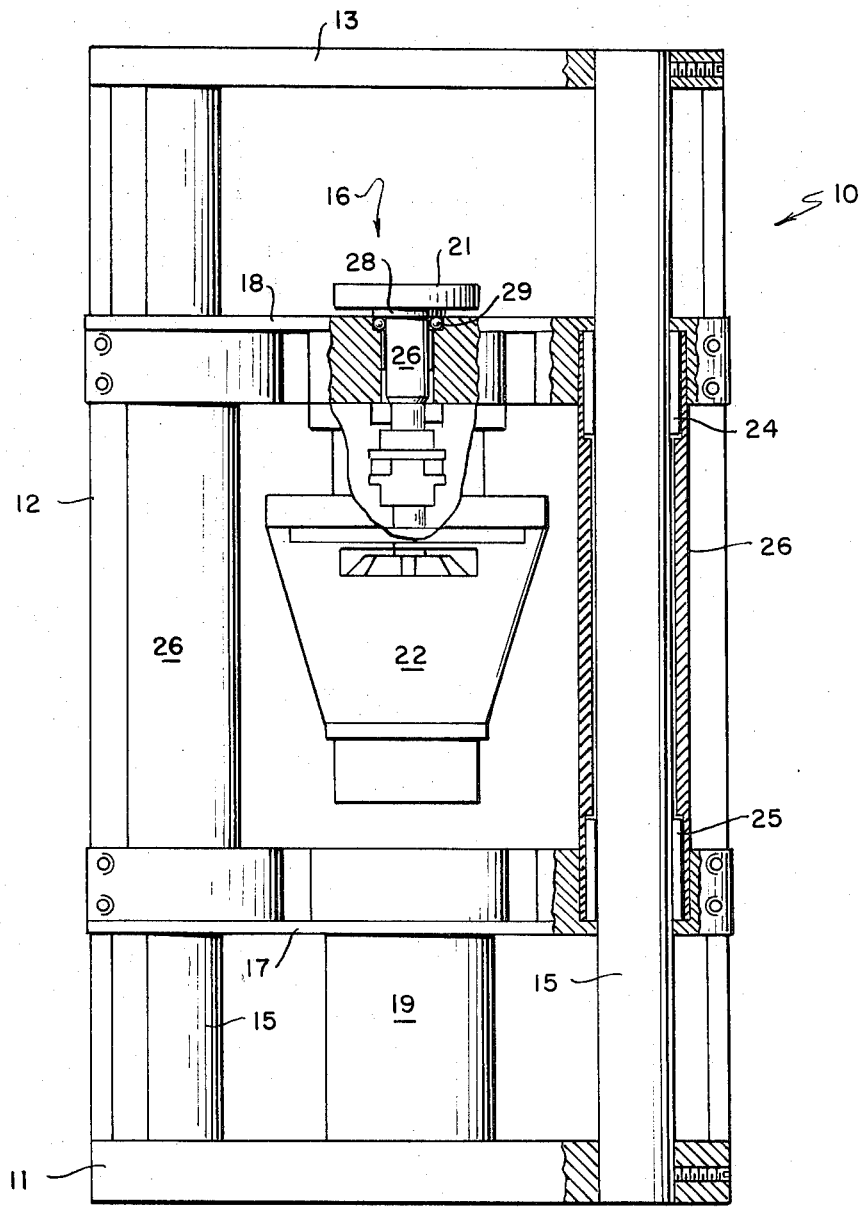
FIG. 2 is a front view of the test stand with parts broken away.

Referring now to the drawing, there is shown a supporting frame 10 having a base plate 11. Mounted on said base 11 and perpendicular thereto is mounted a support member 12. At the end of the support member 12, opposite the base plate and parallel thereto, is a support plate 13 having an opening 14 therethrough for receiving the rocket motor to be tested. Mounted in parallel relation to themselves and to the support member 12 and extending between the support plate 13 and the base 10 are a pair of guide rods 15. Mounted to be slidably guided by said rods 15 is a carriage 16. The carriage includes crossmembers 17 and 18 and sleeve members 26. The crossmember 17 contacts a thrust-sensing device 19 of conventional design while crossmember 18 carries a rotatable support plate 21, shown in FIG. 2. Connected to rotate the plate 21 and supported by the crossmember 18 is a variable speed spin motor 22 which is preferably of a high-speed type and capable of spinning the plate 21 over a wide range of revolutions per minute. The plate 21 is designed to support and spin a rocket motor undergoing test without transmitting the thrust of the rocket motor to the spin motor. The rocket motor to be tested is inserted through the opening 14 in the support plate 13. As shown in the preferred embodiment of the invention, the carriage 16 is mounted with friction-reducing bearings in each of sleeves 26 as shown, for example, in one of the sleeves at 24 and 25. It is to be understood that similar devices are mounted in the other sleeve. The rotating support plate 21 has a flange 28 which rests on antifriction devices 29 and a shaft 26 which extends through suitable opening in crossmember 18 and connects with the shaft of the motor 22.

In operation the rocket motor to be tested is mounted on the support plate 21 and spun by motor 22, which may be a variable speed electric motor or a variable speed air driven motor or a variable speed hydraulic motor, all of conventional design. The rocket motor is ignited and the thrust of the spinning rocket motor is transmitted to the sensing device 19 through the crossmember 18, the sleeves 26 and the crossmember 17. The output of the sensor is then recorded or displayed by suitable devices (not shown) of conventional construction.

It is to be understood that the invention is not limited to the exact details of the construction shown and described for obvious modifications will occur to persons skilled in the art.

I claim:
1. A rocket motor test stand comprising:
   support means having provision for receiving a rocket motor to be tested;
   movable carriage means slidably mounted in said support means;
   said carriage having an upper and lower portion, said portions being rigidly connected to one another;
   rotatable means mounted on the upper portion of said carriage to receive one end of the rocket motor being tested;
   force interceiving means that allows the rotatable means to transmit force only to said carriage;
   drive means mounted on the upper portion of said carriage and connected to said rotatable means for rotating said rotatable means; and
   thrust-sensing means mounted on said support means in contact with the lower portion of said carriage for supporting said carriage and for sensing the thrust transmitted from the upper portion of said carriage to the lower portion thereof via the rigid interconnection of the upper and lower portions whereby none of the rocket thrust force is applied to the drive means.
2. A device as defined in claim 1 wherein said drive means includes a motor for rotating said rotatable means and said rotatable means and said motor are independently mounted on the upper portion of said carriage means such that none of the force from the rocket is applied to said motor.